United States Patent
Heikkila et al.

(10) Patent No.: US 11,860,388 B2
(45) Date of Patent: Jan. 2, 2024

(54) POLYMER COMPATIBLE HEAT FUSED RETROREFLECTIVE BEAD

(71) Applicant: Tundra Composites, LLC, White Bear Lake, MN (US)

(72) Inventors: Kurt Heikkila, Marine on the St. Croix, MN (US); John Kroll, Blaine, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 318 days.

(21) Appl. No.: 17/288,083

(22) PCT Filed: Nov. 25, 2019

(86) PCT No.: PCT/US2019/063067
§ 371 (c)(1),
(2) Date: Apr. 23, 2021

(87) PCT Pub. No.: WO2020/087090
PCT Pub. Date: Apr. 30, 2020

(65) Prior Publication Data
US 2021/0382211 A1    Dec. 9, 2021

Related U.S. Application Data

(63) Continuation of application No. 16/662,421, filed on Oct. 24, 2019, now Pat. No. 11,467,324.

(60) Provisional application No. 62/769,658, filed on Nov. 20, 2018, provisional application No. 62/751,065, filed on Oct. 26, 2018.

(51) Int. Cl.
*G02B 5/13* (2006.01)
*E01F 9/524* (2016.01)

(52) U.S. Cl.
CPC ............... *G02B 5/13* (2013.01); *E01F 9/524* (2016.02)

(58) Field of Classification Search
None
See application file for complete search history.

(56) References Cited

U.S. PATENT DOCUMENTS

| | | |
|---|---|---|
| 2,268,537 A | 12/1941 | Leroy |
| 2,326,634 A | 8/1943 | Gebhard et al. |
| 2,379,702 A | 7/1945 | Gebhard |

(Continued)

FOREIGN PATENT DOCUMENTS

| | | |
|---|---|---|
| KR | 100973980 B1 | 8/2010 |
| WO | 2020087090 A1 | 4/2020 |

OTHER PUBLICATIONS

3M Glass Bubbles iM16K, 2017, St. Paul, MN 55144.

(Continued)

*Primary Examiner* — Jennifer D. Carruth
(74) *Attorney, Agent, or Firm* — Mark DiPietro; Fred Morgan

(57) ABSTRACT

A polymer compatible retroreflective bead. The bead can be used in typical retroreflective uses such as paints tapes and films in highway marking and signs having high retroreflectivity both when initially installed and over the bead lifetime, allowing vehicle drivers to see highway marking lines at night and in adverse conditions during nighttime. When installed the retroreflective beads essentially retroreflect the base color of the highway marking material in which the retroreflective beads are embedded.

12 Claims, 6 Drawing Sheets

(56) References Cited

U.S. PATENT DOCUMENTS

| | | | |
|---|---|---|---|
| 2,610,922 A | 9/1952 | Beck | |
| 2,687,968 A | 8/1954 | Beck | |
| 2,790,723 A | 4/1957 | Stradley et al. | |
| 2,842,446 A | 7/1958 | Beck et al. | |
| 2,853,393 A | 9/1958 | Beck et al. | |
| 2,883,347 A | 4/1959 | Fisher et al. | |
| 2,963,378 A | 12/1960 | Palmquist et al. | |
| 3,254,563 A | 6/1966 | De et al. | |
| 3,365,315 A | 1/1968 | Beck et al. | |
| 3,894,791 A | 7/1975 | Eigenmann | |
| 4,336,092 A | 6/1982 | Wasserman | |
| 4,697,407 A | 10/1987 | Wasserman | |
| 4,983,458 A | 1/1991 | Dejaiffe | |
| 5,057,552 A | 10/1991 | Cavitt et al. | |
| 5,169,558 A | 12/1992 | Smrt et al. | |
| 5,670,209 A | 9/1997 | Wyckoff | |
| 5,750,191 A | 5/1998 | Hachey et al. | |
| 5,853,846 A | 12/1998 | Clark et al. | |
| 5,880,176 A | 3/1999 | Kamoto et al. | |
| 5,900,978 A | 5/1999 | Sagar et al. | |
| 5,928,761 A | 7/1999 | Hedblom et al. | |
| 5,942,280 A * | 8/1999 | Mathers | E01F 9/524 |
| | | | 427/205 |
| 5,947,632 A | 9/1999 | Pirotta et al. | |
| 5,948,833 A | 9/1999 | Jilek et al. | |
| 5,962,108 A | 10/1999 | Nestegard et al. | |
| 5,973,028 A | 10/1999 | Maxwell et al. | |
| 6,011,085 A | 1/2000 | Maxwell et al. | |
| 6,048,915 A | 4/2000 | Clamen et al. | |
| 6,075,079 A | 6/2000 | Helmer et al. | |
| 6,132,132 A | 10/2000 | Pirotta et al. | |
| 6,194,486 B1 | 2/2001 | Yujiri et al. | |
| 6,228,901 B1 | 5/2001 | Brown et al. | |
| 6,277,437 B1 | 8/2001 | Helmer et al. | |
| 6,301,770 B1 | 10/2001 | McIlwraith | |
| 6,335,083 B1 | 1/2002 | Kasai et al. | |
| 6,365,262 B1 | 4/2002 | Hedblom et al. | |
| 6,376,574 B1 | 4/2002 | Helmer et al. | |
| 6,451,874 B1 | 9/2002 | Purgett et al. | |
| 6,479,132 B2 | 11/2002 | Hedblom et al. | |
| 6,479,417 B2 | 11/2002 | Frey et al. | |
| 6,514,892 B1 | 2/2003 | Kasai et al. | |
| 6,689,824 B2 | 2/2004 | Friel et al. | |
| 6,734,226 B2 | 5/2004 | Hermes | |
| 6,734,227 B2 | 5/2004 | Jing et al. | |
| 6,911,486 B2 | 6/2005 | Mimura et al. | |
| 7,506,523 B2 | 3/2009 | Beck | |
| 7,900,474 B2 | 3/2011 | Beck | |
| 8,033,671 B1 | 10/2011 | Nilsen et al. | |
| 8,202,614 B2 | 6/2012 | Koene et al. | |
| 8,292,539 B2 | 10/2012 | Gelfant et al. | |
| 8,394,977 B2 | 3/2013 | Tiefenbruck et al. | |
| 9,207,373 B2 | 12/2015 | Gelfant et al. | |
| 10,241,242 B2 | 3/2019 | Gelfant et al. | |
| 11,467,324 B2 * | 10/2022 | Heikkila | C03C 17/008 |
| 2002/0090515 A1 | 7/2002 | Pellerite et al. | |
| 2003/0036585 A1 | 2/2003 | Purgett et al. | |
| 2003/0069358 A1 | 4/2003 | Helland et al. | |
| 2003/0119945 A1 | 6/2003 | Aibara | |
| 2004/0157960 A1 | 8/2004 | Rowe | |
| 2004/0169928 A1 | 9/2004 | Nilsen et al. | |
| 2005/0015846 A1 | 1/2005 | Vistins et al. | |
| 2005/0032933 A1 | 2/2005 | Hermes et al. | |
| 2005/0282933 A1 | 12/2005 | Patel et al. | |
| 2009/0025872 A1 | 1/2009 | Nilsen et al. | |
| 2009/0098338 A1 * | 4/2009 | Frey | C03C 3/127 |
| | | | 428/143 |
| 2010/0221419 A1 | 9/2010 | Frey et al. | |
| 2010/0272962 A1 | 10/2010 | Davies | |
| 2011/0170193 A1 | 7/2011 | Budd et al. | |
| 2013/0215510 A1 | 8/2013 | Gelfant et al. | |
| 2016/0209559 A1 | 7/2016 | McCarthy et al. | |
| 2017/0242165 A1 | 8/2017 | Bachman et al. | |
| 2018/0127915 A1 * | 5/2018 | Nowak | G02B 5/128 |
| 2018/0291175 A1 | 10/2018 | Wilding et al. | |
| 2020/0115289 A1 | 4/2020 | Heikkila | |
| 2022/0283342 A1 * | 9/2022 | Heikkila | E01F 9/524 |

OTHER PUBLICATIONS

3M Glass Bubbles Start something big by thinking small, 2018, St Paul MN, 55144.

Don McClure, Retroreflective Films: constructions, history, and applications, pp. 1-25, Ft. Pierce FL 34951.

James Kalchbrenner, Large Glass Beads for Pavement Markings, pp. 1-9, Transportation Research Record 1230.

Jay K. Lindly, Evaluation of Double Drop Beads Pavement Edge Lines, 2009, University Transportation Center for Alabama, UTCA Report No. 05409, Aug. 2009.

Life-Cycle Cost Analysis of Retroreflective Glass Beads, Tri-Service Pavements Working Gourp (TSPWG) Manual, Dept. of Defense, pp. 1-28, Jan. 24, 2018.

Paul Carlson, Importance of Pavement Marking Retroreflectivity Standards, p. 1-30, International Bridge, Tunnel and Turnpike Assoc., Texas A&M Transportation Institute.

Reflective Glass Beads, Chapter 2, pp. 1-20.

Richard L. Austin, Guide to Retroreflection and Saftey Principles and Retroreflective Measurements, pp. 1-32, 2009, RoadVista, San Diego CA 92131.

Ultimate Nightime Perfromance Wet or Dry, 2013, St Paul MN, 55144.

V Fang, A review of near infrared reflectance properties of metal oxide nanostructures, GBS Science Report 2013/39, Institute Of Geological And Nuclear Sciences, Jul. 2013.

* cited by examiner

POLYMER COMPATIBLE HEAT FUSED RETROREFLECTIVE BEAD

FIELD

The embodiments of this application relate generally to high reflectivity retroreflective spherical objects that can be used in useful applications such as in reflective articles in combination with a polymer, typically with the object in contact with, dispersed or embedded in the polymer. The applications for the article include highway striping and related marking materials as well as to aesthetic applications, for example, countertops, signage and safety applications. Specifically, the various embodiments in retroreflective objects and their application in reflective articles enhance visibility especially during conditions of low light such as nighttime.

BACKGROUND

Retroreflective objects are known. Retroreflection is the mechanism whereby light incident on a surface is reflected in a way that much of the incident light is directed back towards the light source. Some known retroreflective elements have centers formed of polymeric cores or binders. A pigmented core or binder may serve as a diffuse reflector, allowing spherical optical elements to be used on horizontal and vertical surfaces. Other constructions have transparent optical elements including specular reflectors such as metallic silver. The metallic surface directs light back towards the light source. In such cases pigmented cores are not used. Geometry of the optics may make a specular coated optical element less effective when embedded in pavement marking paint on a horizontal surface, and more effective when embedded in the vertical surfaces of a retroreflective support element.

Another retroreflective element construction uses silvered glass flakes as a specular reflector on the surface of a spherical polymeric core; no spherical optical elements are used. Still another known construction has a retroreflective element with a plastic globule refracting incident light onto a layer of glass optical elements attached to the bottom of the globule. The glass optical elements focus light onto a specular coating or film located below the elements. Incident light is then reflected along the original path towards the source. Shaped polymeric retroreflective elements with pigmented cores and glass optical elements embedded in the vertical surfaces are another alternative. These retroreflective elements are formed by extruding pigmented polymer into rods of different cross-sectional shapes. Glass optical elements are embedded into the surface of the polymer before it hardens, then the rods are sliced to form the elements.

Polymeric compositions, articles, coatings with retroreflective elements are undesirably susceptible to wear, especially in high contact or traffic regions, and to degradation due to weathering. To overcome these limitations, retroreflective elements have been constructed having a ceramic core surrounded by optical glass with a metallic specular coating. One such construction approach is a rock or glass sphere core covered by a polymeric binder with glass optical elements having a specular metallic coating embedded in or adhered to the polymeric coating. Another construction includes a glass sphere and a layer of glass optical elements adhered to the sphere with a polymeric adhesive. A metallic film below the glass optical elements acts as a specular reflector. However, these glass sphere-metallic film combination do not provide the brilliant white or yellow color for the reflective light that is desirable in a high-quality highway and is necessary to meet the requirements of many regulatory authorities. The glass sphere-metallic film approach tends to produce reflected light that is grey or silver, instead of white, or that is bronze or gold, instead of yellow.

Other constructions include a composite lens element serving both as a retroreflective element and a skid-resistant particle. The skid-resistant particle, which acts as a core, may be either a corundum particle or glass sphere, and is coated with a pigmented polymeric binder acting as a diffuse reflector.

A ceramic element having glass optical elements embedded throughout a glass core and at the core surface is another approach. A thin metallic film separates the optical elements and the glass core to provide an efficient specular retroreflective system. Alternatively, optical elements having a refractive index greater than 2.0 are used. These high refractive index optical elements are asserted as being capable of reflecting light without the need for a reflective backing.

U.S. Pat. No. 8,292,539 and U.S. Pat. App. Pub. 2018/0291175 disclose a microsphere sphere and bead agglomerate wherein the spheres and beads are adhesively bonded.

The most common use is in traffic control such as retroreflective pavement markings, such as lane lines on roadways, signs etc. These are made by dropping transparent glass or ceramic optical elements onto a freshly painted line to which the optical elements become partially embedded therein. Incident light desirably passes through the optical elements to the pavement marking paint or sheet, striking any pigment particles embedded therein. The pigment particles scatter the light. The scattered light includes a portion that is directed back into the optical element, which then redirects that portion of light back towards the light source.

In addition to providing desired optical effects, pavement markings must withstand road traffic, road maintenance, and adverse weather conditions, and are subject to cost constraints during manufacture and installation. Vertically oriented or upwardly disposed surfaces provide good orientation for retroreflection. As a result, attempts have been made to incorporate vertical surfaces in pavement markings, such as by providing protrusions in the marking surface. Vertical surfaces may advantageously prevent build-up of water over the retroreflective surface during rainy weather, which water would otherwise interfere with retroreflection.

Pavement markings such as paints, tapes, films and individually mounted articles to guide and direct motorists traveling along a roadway are known. During daylight the markings may be sufficiently illuminated by ambient light to effectively signal and guide motorists. At night, especially when the primary source of illumination is the vehicle's headlights, the markings may be insufficient to guide motorists because light from vehicle headlights hits the pavement and pavement markings at a very low angle of incidence, with the result that the light largely reflects away from the vehicle.

Sometimes raised pavement markers are placed at intervals along a pavement marking line. These markers are relatively large, generally being several centimeters in width, and five to twenty millimeters in height. Typically, such markers require assembly of different components, some of which were previously individually molded or cast. Therefore, such markers are relatively expensive to manufacture. The size of the markers makes them subject to substantial impact forces from passing vehicles. As a result, the markers must be well secured to the pavement, increasing installation costs and removal costs when the markers must be replaced. Moreover, because the markers are applied at intervals, the reflected light provided by the markers are in the form of discontinuous spots of light. A continuous bright line of reflective light is more desirable.

Embossed pavement marking tapes represent an approach that has been taken towards providing better highway marking surfaces. Selective placement of transparent optical elements on the sides of embossed raised protrusions present in the tapes results in somewhat effective marking. However, such tapes are relatively expensive compared to painted markings and tend to pick up dirt that adheres to the tape even after a hard rain. As a result, tape usage is often limited to lower traffic areas such as unlighted intersections and railway crossings. These embossed tapes are constructed with polymeric materials which are susceptible to wear.

Yet another approach to providing retroreflection is the composite retroreflective element. These retroreflective elements essentially have a core with optical elements embedded in the core surface. Some also contain optical elements dispersed throughout the core that become exposed with wear. The core may be irregular in shape or may be shaped as a sphere, tetrahedron, disc, square, tile, etc.

The most common physical embodiments of the retroreflective spherical articles are in the form of paints, tapes and films. Paints typically are made by combining an aqueous or organic solvent with a polymeric vehicle, often a pigment, and the retroreflective article. Once applied, the paint volatilizes the solvent leaving a film of the vehicle pigment and retroreflective article dispersed therein. Tapes and films are similar in structure and manufacture and can be extruded with the retroreflective article dispersed therein. Other structures can be made by contacting the retroreflective article onto a polymer surface and fixing it in place. In all these applications, the lack of polymer to retroreflective article compatibility prevents easy manufacture of these types of articles and if made, the articles have a reduced lifetime. A substantial need exists to improve the compatibility of the retroreflective article with the polymer materials.

BRIEF DESCRIPTION

We have found that a polymer compatible retroreflective object can be made for dispersion or imbedding into a polymer. The object can be made compatible with and used on, in or with a polymer by coating a retroreflective object with an interfacial modifier (IM) that is compatible with the polymer. The IM used in the object coating can be different from any other IM used in any other part of the object itself, if any, or in the articles including tape, film or paint.

The term "central" bead or sphere is a larger spherical object upon which the smaller peripheral spherical objects are arrayed.

The "peripheral" microsphere is a spherical object of substantially smaller diameter than the central bead that is arrayed upon the surface of the central bead.

The "array" of the peripheral microspheres is ordered by the distribution of the peripheral microspheres on the surface of the central beads in substantially a single layer or monolayer. The peripheral microspheres and the central beads are in contact at a point with one and each other of the bead components via the coating of the interfacial modifier that is heat treated to obtain a solid bond of atoms from the microsphere and bead and the IM. The array can fully cover or partially cover the central bead.

A "retroreflective bead" or "object" is a central bead with an array of peripheral microspheres on its surface and an overall coating to an interfacial modifier. Any retroreflective bead can be used including but not limited to beads made by heat bonding the peripheral microsphere to the central bead. Such bonding can be facilitated by an interfacial modifier or other manufacturing processes.

The "article" is a combination of the "retroreflective bead" or "object" and other components.

The term "self-ordered" is the packing of substantially the same size peripheral microspheres as a monolayer, and array, on the periphery of the central bead. The density of the monolayer over the periphery is often greater than 50, 60, 70, 80 or 90% of the surface area of the periphery of the central bead.

The term "heat bonded' means that the central bead is bonded to the array of peripheral beads at an interface structure. The bond can be formed comprising atoms from both the central and peripheral microspheres and non-volatile component of the interfacial modifier. The heat bond is formed at a temperature below that of the glass in the microspheres and the beads retain their spherical nature except for the bond at the interface. The bond can comprise an alloy structure or a structure formed as atoms from the microsphere and bead diffuses into the space between. The separate spherical structures are maintained, and heat bonded.

The term "paint" means a typically liquid material that can be applied to a surface comprising an aqueous or organic solvent, a vehicle, and the retroreflective object as claimed and an optional pigment if necessary.

The term "film" typically refers to a thin, sheet-like material made of a thermoplastic polymer and a retroreflective article along with optional polymeric additives and pigments or dyes.

The term "tape" typically refers to an extruded polymeric sheet having an indeterminate length or arbitrary length for the purpose of winding the tape onto a spool for application. Often the tape is made with a layer of adhesive and a release liner.

DETAILED DESCRIPTION

Figure 1:
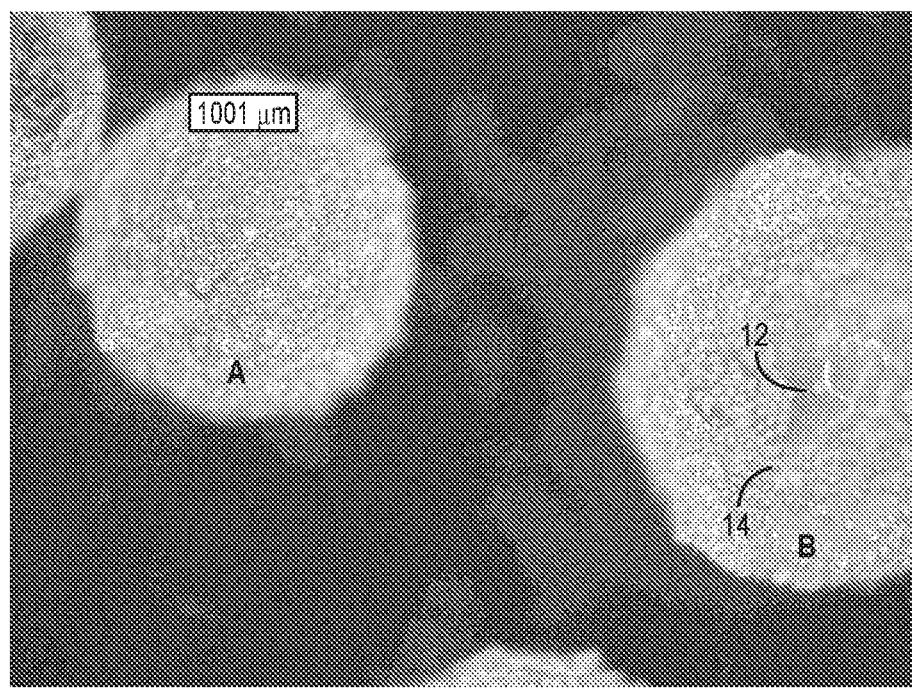
FIG. 1 is a photo micrograph of retroreflective generally spherical glass beads for highway marking in accordance with embodiments of the disclosure.

The appropriate interfacial modifier for the entire article, to ensure compatibility with polymer materials used in paints, films and tapes, can be determined by measuring the viscosity of the materials during and after manufacture. The article comprises a central bead and a peripheral bead.

Beads

The retroreflective beads may be used as tapes, films, coatings or paints. Alternatively, the retroreflective materials can be applied to a highway surface by trucks dropping exact amounts of the retroreflectives on freshly applied highway and colored marking lines. The lines utilize two component curing/reactive chemistries such as epoxy, epoxy hybrids, polyurethanes and polyureas and are often pigmented either yellow or light. However, the embodiments are not limited by the base color of the surface. When the retroreflective beads are applied, the line is flooded with the retroreflective beads that embed into the surface of the line. The line is ready for traffic in two to ten minutes, depending on the specific line chemistry used. Alternatively, the retroreflective bead article may be mixed with small, bare retroreflective beads known in the art.

The central bead has a useful diameter range of from about 0.1 to 5 mm or 0.2 to 2 mm or 1 to 1.5 mm and the peripheral components are in the range of from about 5 to 300μ, or 15 to 200μ (micron) and further the peripheral glass microsphere components cover the central component in an array (i.e.) substantially a monolayer over the surface of the central component. The surface area of the central glass bead component comprises about 50 to 100% or 80 to 99% coverage in a substantial monolayer of the smaller sphere. Both the central component and the peripheral components can be of generally hollow or solid spherical configuration. A variety of manufacturing techniques are used to make these objects. Such objects are sold by Potters Industries, 3M and others.

In one option, the bead has the peripheral bead array affixed to the surface of the central bead. We have found that a composite spherical retroreflective object can be made by adhering or fusing a coating or array of microspheres on the surface a larger spherical glass bead.

In one embodiments this application provides a retroreflective bead object having a distribution or coating of microspheres hollow spheres on a larger solid glass bead with adhesion or other polymeric bonding. These are usable in standard retroreflective uses. For example, for highway marking having high retroreflectivity both when initially installed and over the bead lifetime, allowing vehicle drivers to see highway marking lines at night and in adverse conditions during nighttime. When installed the retroreflective beads essentially retroreflect the base color of the highway marking material in which the retroreflective beads are embedded.

In one embodiment, an interfacial modifier can be used to initially form a self-ordered monolayer layer coating that substantial covers the surface of the larger sphere. The composite can be heated to fuse the smaller microspheres to the bead and to volatilize and remove any organic component of the IM. The resulting fused bond includes mass from the microspheres, the larger bead and any non-volatile residue generally inorganic component of the IM. The IM both obtains the self-ordered coating and promotes formation of the fusion bonding. The appropriate interfacial modifier for manufacturing retroreflective article can be measured by monitoring the temperature of the sintering process in which the bead and the microsphere are fused. An effective interfacial modifier will obtain a fused retroreflective object that maintains its optical clarity at a minimal manufacturing temperature. In one of its several aspects this application provides a retroreflective device includes a generally large spherical glass central component, and a plurality of peripheral microspheres components connected to the central component by heat fusion/bonding of the particles under the influence of an interfacial modifier (IM) coating. The peripheral microspheres are dispersed on the surfaces of the glass central component with an IM coating to form the retroreflective bead. The IM obtains a substantially complete self-ordered, single layer coating and enhances fusion of the peripheral microsphere components to the glass central component. In the heat fusion step, any organic component of the IM is substantially volatilized leaving a fused bonded interface. No significant amount of organic material is present to form a bond of the smaller component to the larger. The fused bond includes mass from the central bead, the smaller sphere and any non-organic residue from the IM. Once fused the IM free object is coated with IM that is not volatilized, remains and is used to promote polymer compatibility.

In this option, have found that the retroreflective object is manufactured using a first interfacial modifier to ensure a fused bond between the microsphere and the bead. The resulting product is then further coated with a second, optionally different, interfacial modifier. In this way, the first interfacial modifier ensures a quality bond between the fused bond between the microsphere and the bead whereas the second interfacial modifier ensures that the resulting product is fully compatible with any polymer material that may be used in an application such as a paint, tape or film. The article can be made with a retroreflective object the is made with other manufacturing techniques other than IM promoted heat binding.

Process

The interfacial IM has two functions. First it promotes self-ordering of the glass microsphere single or monolayer on the bead and promoting the fused bonding to form a retroreflective object. Second, the IM coating on the object promotes compatibility of the object with a polymer in an end use. In an embodiment both the large central microsphere bead and small peripheral microsphere bead are typically coated with an interfacial surface chemical treatment also called an interfacial modifier (IM) that supports or enhances the final properties such as, rheology, high packing fraction, and bead surface inertness. These properties are not present in contemporary mixed materials. The beads can be coated with IM separately or the beads can be combined and then coated. Further, the large central bead can be coated with the interfacial modifier and the smaller peripheral microsphere beads can be arrayed upon the large central bead.

Coat Bead

The retroreflective bead comprising the central bead and coating of peripheral beads are coated with IM before use in an article. The process to make the article commences with collecting a supply of largely spherical, retroreflective bead. The retroreflective bead is then coated with IM and then combined with other materials to make the article.

Suitable amounts of an interfacial modifier can be added to the retroreflective bead and is mixed until a controlled exterior coating of the interfacial modifier that is substantially a continuous and uniform layer over the surface periphery. During the blending phase, surface tension also known as capillary attraction are believed to be forces between beads that causes an ordered array due to the thin interfacial modifier continuous layer. In the absence of the IM the peripheral bead does not readily associate with the other components in the article. An excess of IM prevents any useful association and a smaller amount of interfacial modifier coating can fail to complete the coating during this blending process. After mixing and blending, the resulting composite can be washed to remove staring materials and dried to obtain a useful coated retroreflective composite bead. The polymer compatible IM enables the bead form useful retroreflective installations with a polymer.

Make Object

The process to make the retroreflective glass object commences with collecting a supply of largely spherical, essentially clear, relatively larger glass central bead or component referred to sometimes herein as "bead" or "sphere". The peripheral beads are then affixed to the central bead using a variety of techniques. Including adhesion or polymer bonding.

Suitable amounts of an interfacial modifier can be added to the large central beads and the resulting combination is mixed until the large beads have a controlled exterior coating of the interfacial modifier that is substantially a continuous and uniform layer over the bead surface periphery. Next the smaller peripheral glass beads, optionally with an IM coating, that are generally spherical or at least rounded in form, are added to the mixture of large beads coated with the interfacial modifier and the resulting new mixture of interfacially modified coated large beads and small beads are blended. During the blending phase, self-ordering of the small peripheral beads occurs on the surface of the larger central bead. Surface tension also known as capillary attraction are believed to be forces between the central bead and the peripheral beads that causes an ordered array due to the thin interfacial modifier continuous layer. In the absence of the IM the peripheral bead does not readily associate with the central bead. An excess of IM prevents any useful association of peripheral bead to central bead. A small amount of interfacial modifier coating the large bead is transferred to the surface of the small bead during this blending process. The surface effect of the interfacial modifier on the surface of the large bead is the contact point between the large and small beads. The amount or number of small beads added to the mixture can be adjusted to control the amount and extent of peripheral bead distribution on the central bead and tune the later bonding process. After mixing and blending the large and small glass bead components, a plurality of the smaller beads is ordered as a monolayer on the surface of the larger beads. The coated bead is heated to fuse the microspheres to the central bead. The resulting composite can be washed to remove staring materials and dried to obtain a useful retroreflective composite bead. Once prepared the fused bead is further coated with a polymer compatible IM that enables the bead form useful retroreflective installations with a polymer.

In this practice of the embodiment, all of the processing, including mixing of the various beads and coatings, the time for the interfacial modifier to cover the surfaces of the initial group of larger beads and for self-ordering of the small beads to associate the small spherical glass members to the interfacially modifier surface of the larger glass beads to form the retroreflective glass bead object occurs in reasonable period.

In a more specific embodiment for fabricating retroreflective glass bead object the retroreflective glass object comprises larger central generally spherical glass components with each larger bead having a plurality of smaller peripheral generally spherical glass components heat bonded to the central bead components. The heat bonded retroreflective bead object provided will retroreflect any color such as, for example, either white or yellow according to the pigment(s) selected for incorporation into the highway marker, or other pigments that may be incorporated into countertops or safety equipment.

The method includes coating a supply of generally spherical essentially clear larger glass central components. Onto the central bead is coated about 0.1 to about 2 parts by weight of an interfacial modifier and the IM coated large beads is blended with the supply of the smaller, spherical glass components into a mixture. The microspheres components are blended into the coated mixture until the central larger generally spherical glass components are substantially covered by an array of the peripheral smaller components self-ordered on the surface of the interfacial modifier coating the large central glass bead in a monolayer of small glass components.

The method includes coating a supply of generally spherical fused retroreflective objects having the glass microsphere coating. Onto the object is coated about 0.1 to about 2 parts by weight of an interfacial modifier. The microspheres microsphere components are substantially covered by the interfacial modifier in a monolayer of IM.

In another embodiment, the interfacial modifier may coat the large bead component and the smaller, simultaneously or separately, generally spherical glass components may comprise a coating of interfacial modifier, all relative to the small glass bead component. The large and small bead components are then mixed together to provide a large central bead coated with an array of a plurality of smaller peripheral beads.

As in the above first described embodiments, all of the processing, including preparing the dispersion, mixing the various reagents, allowing time for the dispersion to cover the initial group of larger glass components and for the associating, resulting in the array of the small spherical glass components to the larger glass members, occurs quickly often over a period ranging from as little as about 30 seconds to a maximum of about many minutes.

Use of Coated Retroreflective Bead

In some embodiments, a kit comprising a plurality of individually packaged units of the heat bonded, retroreflective bead objects to be administered during application of the highway marking strip or during application to other surfaces requiring retroreflectivity are supplied with instructions for use. The individually packaged units may comprise heat bonded retroreflective beads all of one size. In another aspect, individually packaged units may comprise heat bonded retroreflective bead in mixed sizes. In another aspect, individually packaged units may comprise heat bonded retroreflective beads mixed with beads that are not heat bonded retroreflective beads.

A further embodiment is to apply the retroreflective beads to a highway by trucks dropping exact amounts of the retroreflective beads on freshly applied thermoplastic or latex colored paint.

The retroreflective bead object performance characteristics can be measured in several ways: retro reflectivity of the bead by itself; retroreflectivity of the bead in a painted highway marking line; color of the line after addition of the retroreflective beads as compared to color without retroreflective beads; retroreflectivity of the line after wear testing with traffic; and color of the line with retroreflective beads after wear testing. ASTM E1710 for retroreflectivity and ASTM E1349 for color are the test methods used.

Heat Bonding

The key steps in making the retroreflective glass bead are 1) preparation of the large and small bead components being used for making the retroreflective bead, 2) coating the large microsphere central bead component and, optionally, the smaller microsphere peripheral bead components with interfacial modifier, 3) mixing the small bead components with the large bead components 4) obtaining a substantially complete, single layer, self-ordered array of the small bead peripheral components onto the large bead central components; and 5) heating the large and small bead components to form a large central bead, heat bonding the ordered array of a plurality of small glass peripheral beads onto the central bead's exterior surface. The large bead component is well covered with the small beads on the surface of the large bead component through the effect of the interfacial modifier coated on the surface of the large bead component. In an embodiment the coverage of the array of small microsphere peripheral bead component over the large microsphere central bead component of the retroreflective glass bead object is a single ordered layer, monolayer, of the small beads on each of the large beads in a mixture of the bead sizes. An ordered array of the small bead component on the interfacially modified surface of the large bead can be greater than 50, 60, 70, 80, 90, or 95% of the surface area of the large bead.

When heated to a bonding temperature, at the microsphere/bead interfaces, each adjacent bead and non-volatile portions from the interfacial modifier can combine to form a heated fused bond between beads with the large bead component being the center structure and the small peripheral bead component dispersed onto and heat bonded to the surfaces of the other large central components. Similarly, at contact points between peripheral beads, heat bonding processes can bond the adjacent peripheral beads forming a more stable and durable surface array on the large central bead. Heat bonding together by volatilizing any organic component of the assembly, and producing alloying, atomic diffusion or atomic transport events between beads and IM. The driving force is the combination of atoms at the interface and a reduction in the system free energy, manifested by decreased surface curvatures, and an elimination of surface area. The bond contains mass derived from the central bead the smaller sphere and any non-organic, non-volatile component of the IM. Heat bond formation is similar with adjacent microspheres.

The interfacial modifier on a bead surface may cooperate in the heat bonding process and in obtaining a polymer compatible bead. The IM helps in fusing with other interfacial modifier coatings on other beads to form the heat bonded product. At the contact point either between the large central bead and small peripheral bead or between separate small peripheral beads adjacent to each other, a solid attachment or "neck" is formed between either the large bead and small bead surface or between the surfaces of adjacent small beads. Not being bound by theory, the "neck" connecting the bead surfaces appears to be solid material that may have originated from the interfacial modifier coating and uncoated grain boundaries between adjacent bead surfaces. The neck appears to hold the smaller bead in a rigid posture relative to the surface of the large bead. This rigid posture aids in retroreflection of light beams by not allowing movement of the smaller peripheral bead and thus disruption of the light refracting and reflecting through the smaller peripheral bead surfaces. The neck may also aid in providing durability to abrasion to the large and small bead finished structure. In some embodiments this neck or attachment at the contact point between either the large central or small peripheral beads may have some optical properties and may capture and reflect or scatter light directed through the glass beads. In some embodiments, the neck can be cylindrical or concave in shape and profile. Additional IM applied before polymer contact promotes polymer compatibility.

The interfacial modified surfaces that bond may be the same or different relative to the organic interfacial modifier. Temperatures we have used are about 500 to 800° C. A useful temperature is about 640 to 780° C. Using a heating profile, of one to ten hours, that ramps temperature slowly from ambient to a maximum and holding for a period before slowly returning to ambient is helpful in forming the fusion bond and maintaining clarity.

The steps in forming a retroreflective bead may be summarized as follows:
1) Large central, and small peripheral, IM bead coating;
2) Large central mixing with small beads ordering themselves to form an array of small peripheral beads on the surface of the interfacially modified coated large central bead;
3) Coating the glass bead with microspheres to form a coated body or a preform;
4) Heating the coated retroreflective bead preform; and
5) Post heating finishing such as washing and size classification.

The retroreflection of the retroreflective bead object is an important property of the embodiment. When light strikes a retroreflective bead, it is refracted and reflected through the bead. Refraction is the bending of the light. A bead's ability to bend light is measured by its index of refraction, which is a ratio of the sine of the angle of incidence to that of the refraction. The retroreflectivity of glass beads is better explained by examining the path of light as it enters a single retroreflective bead embedded in a surface such as, for example, highway paint, safety apparatus, or countertops.

As the light beam enters the retroreflective bead, the beam is bent or refracted downward. This beam then shines on the back surface of the smaller bead attached to the surface of the large bead, which is partially embedded in the paint, thermoplastic, countertop, safety equipment etc. The bead works like a mirror. If the surface was not present, the light would continue through the bead and bounce and scatter in many directions. This is one reason for proper retroreflective bead embedment depth in the surface. The light is bent (refracted) downward by the curved surface of the small beads to a point below where the retroreflective bead is embedded in the surface. Thus, when light is reflected off the surface at the back of the bead, a large portion of that light is reflected through the retroreflective bead and then refracted back toward your eyes.

The amount of refraction of light is characteristic of the glass composition and is known as the refractive index (R.I.) of the glass. The refractive index of the glass is dependent upon the chemical nature of the glass material. Various types of glass used in the construction of the glass bead have different indices of refraction and cause different amounts of light to be retroreflected. Water has an index of refraction of 1.33, while the typical single beads made with soda glass has a refractive index of 1.50. Contemporary beads used in the pavement marking industry, for example, are available in refractive indexes of 1.50, 1.65 and 1.90. The highest refractive material is 1.90 and is a very expensive bead to produce. Also, its durability is not as good as the soda glass type. Beads with a refractive index of 1.90 are generally called, "airport beads," since this type of bead is used to mark runways at airports. Useful glass material for the retroreflective bead of the embodiment have a refractive index of 1.50 for both the large and small beads.

Retroreflectivity is dependent upon the depth of the bead in a surface, for example, pavement marking material. For said pavement marking material, optimum depth of contemporary reflective beads in pavement marking material is 50-60% to assure optimum retroreflectivity. Embedment of less than 50% may affect the longevity of the beads due to abrasion or crushing forces. Increasing embedment beyond 60% significantly decreases the amount of light that can be directed back to the driver. The retroreflective glass bead object somewhat alleviates this problem because of the monolayer of many small beads heat bonded to the surface of the large beads. A bead completely buried in the binder is non-retroreflective as no light enters the bead.

In summary, the amount of glass bead embedment will affect the retroreflectivity and the pavement line durability. For optimum retroreflectivity and durability, a bead should be covered by a protective layer and embedded at 50-60% of its diameter. Not all beads will be embedded 50-60%. Some beads will be completely buried more than 50% and others will be embedded less than 50%.

For the retroreflective glass bead object of the embodiment, the small beads arrayed on the periphery of the large bead presents many more curved surfaces for light to be transmitted, reflected, and refracted through the bead. The result is said beads can be embedded deeper into a surface such as pavement marking material without a loss of effective retroreflectivity as measured by suitable instrumentation. Further deeper embedment enhances the durability of retroreflective bead in the pavement line with resulting lower maintenance costs.

Solid glass beads or spheres (including both hollow spheres and microspheres and solid particulates) are useful materials in the embodiments. These spheres are strong enough to avoid being crushed or broken during further processing, such as by high pressure spraying, kneading, extrusion or injection molding. In some embodiments these spheres have particle sizes close to the sizes of other particulate if mixed together as one material.

In some embodiments, the retroreflective bead object, either large central bead component or the small bead peripheral component, include at least one of silica or alumina. In some embodiments that include silica, the silica can be, for example, fumed silica, precipitated silica, surface modified silica, or nano-silica. Some examples of such silica-containing particles include, for example, fumed silica available under the trade designation AEROSIL from Evonik Degussa, (Parsippany, N.J.); precipitated silica available under the trade designation FLO-GARD from PPG Industries (Pittsburgh, Pa.), and nano-silica as described in, for example, U.S. Pat. No. 8,394,977, incorporated herein by reference.

In some embodiments the retroreflective bead object can comprise glass beads comprising aluminosilicate, boron trioxide, borophophosilicate, borosilicate, cobalt, fluorophosphate, fluorosilicate, germanium dioxide, lead glass, opaline glass, soda lime, sodium hexametaphosphate, sodium silicate, tellurite, thoriated glass, uranium glass, or vitrite. The use of these glass compositions or their mixtures are to provide specific characteristic to the glass bead media such as coloring, marking, durability, cost etc.

In some embodiments the beads can be shapes other than generally spherical. Such non-spherical shapes can include cubic, tetrahedral, pyramidal, etc. Spherical and non-spherical shapes can be mixed in the making of the retroreflective bead object depending on the application. An optimum sphere range of sizes of beads makes up a product which produces the maximum retroreflectivity and highway longevity. A combination of a larger glass component and a microsphere wherein there is about 0.1 to 40 or 5 to 35 wt. % of the smaller and about 99.9 to about 75 or 95 to 65 wt. % of larger particles can be used were the ratio of the diameter of the larger particles to the ratio of the microsphere is greater than about 2:1, 3:1, 4:1, 5:1, 6:1, 7:1, 10:1, 12:1, 1:25, or 1:200. Percentages based on the particulate. Optionally, glass beads used within the embodiments can include both solid and hollow glass spheres.

The larger single glass beads that form the center of the retroreflective bead object in the embodiments are available on the market such as Visibead II Plus beads available from Potters Industries, Inc. in Valley Forge, Pa. These beads range in size from 1.0 to 1.5 mm and have a high percentage population that are substantially spherical or round.

The microspheres beads can be 15 to 20 microns from Potters Industries, Inc. in Valley Forge, Pa.

Interfacial Modifier (IM)

An interfacially modified coating is a substantially complete coating of an interfacial modifier (IM) with a thickness of less than 1000 Angstroms often less than 200 Angstroms, and commonly 10 to 500 Angstroms (Å). An interfacial modifier is an organo-metallic material that provides an exterior coating. Such a coating can be used initially to produce the object and can also be used as a coating on the finished object before combining the object into the article.

An interfacial modifier is an organic material, in some examples an organo-metallic material, that provides an exterior coating on the beads to provide a surface that can promote the tendency to associate or form an array with bead to bead contact. Once formed the microsphere coated central bead is heated to fuse the microspheres to the bead and the microspheres to one another. During heating, the organic portions of the IM are volatilized, and the non-volatile residue cooperate with the glass components to form and enhance the bonding structure. The lack of reactive bonding between the bead components before heat bonding leads to the formation of an interlocked or inter-bonded novel bead structure array. Thus, an interfacial modifier is not an adhesive because two surfaces are not being joined together to resist separation. In one embodiment, the coating of interfacial modifier at least partially covers the surface of the bead. In another embodiment, the coating of interfacial modifier continuously and uniformly covers the surface of the bead, in a continuous coating phase layer. The IM can be a liquid or solid at temperatures less than 35° C. Liquid IM has the ability to rapidly coat the larger central beds.

Interfacial modifiers used in the application fall into broad categories including, for example, titanate compounds, zirconate compounds, hafnium compounds, samarium compounds, strontium compounds, neodymium compounds, yttrium compounds, boron compounds, cobalt compounds, phosphonate compounds, aluminate compounds and zinc compounds. Aluminates, phosphonates, titanate and Zirconate that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. In embodiments, the titanate and zirconate contain from about 2 to about 3 ligands comprising hydrocarbyl phosphate esters and/or hydrocarbyl sulfonate esters, or 3 of such ligands, about 1 to 2 hydrocarbyl ligands, lastly 1 hydrocarbyl ligand.

In one embodiment, the interfacial modifier that can be used is a type of organo-metallic material such as organo-cobalt, organo-iron, organo-nickel, organo-titanate, organo-boron, organo-aluminate organo-strontium, organo-neodymium, organo-yttrium, organo-zinc or organo-zirconate. The specific type of organo-titanate, organo-aluminates, organo-strontium, organo-neodymium, organo-yttrium, organo-cobalt, organo-zirconate which can be used, and which can be referred to as organo-metallic compounds are distinguished by the presence of at least one hydrolysable group and at least one organic moiety. Mixtures of the organo-metallic materials may be used. The mixture of the interfacial modifiers may be applied inter- or intra-bead, which means at least one bead may has more than one interfacial modifier coating the surface (intra), or more than one interfacial modifier coating may be applied to different beads or bead size distributions (inter).

Certain of these types of compounds may be defined by the following general formula:

$$M(R_1)_n(R_2)_m$$

wherein M is a central atom selected from such metals as, for example, Ti, Al, Hf, Sa, Sr, Nd, Yt, B, Co, P, Zn, and Zr and other metal centers; $R_1$ is a hydrolysable group; $R_2$ is a group consisting of an organic moiety, such as an organic group that is non-reactive with polymer or other film former; wherein the sum of m+n must equal the coordination number of the central atom and where n is an integer ≥1 and m is an integer ≥1. Particularly $R_1$ is an alkoxy group having less than 12 carbon atoms. Other useful groups are those alkoxy groups, which have less than 6 carbons, and alkoxy groups having 1-3 C atoms. $R_2$ is an organic group including between 6-30, often 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic. $R_2$ is substantially unreactive, i.e. not providing attachment or bonding, to other particles or fiber within the composite material. Titanates provide antioxidant properties and can modify or control cure chemistry.

The use of an interfacial modifier results in workable viscosity for the large bead components. Minimal amounts of the modifier can be used including about 0.005 to 8 wt.-%, about 0.01 to 6 wt.-%, about 0.02 to 5 wt.-%, or about 0.02 to 3 wt. %. The IM coating can be formed as a coating of at least 3 molecular layers or at least about 50 or about 100 to 500 or about 100 to 1000 angstroms (Å).

Making Polymer Based Products

Once the coated retroreflective objects are prepared it can be used in or with a polymer in a reflective composition. Such compositions can be made with conventional thermoset, thermoplastic or melt technology or by conventional liquid blending techniques the retroreflective beads may be used as tapes, films, coatings or paints. Alternatively, the retroreflective materials can be applied to a highway surface by trucks dropping exact amounts of the retroreflectives on freshly applied highway and colored marking lines. The lines utilize two component curing/reactive chemistries such as epoxy, epoxy hybrids, polyurethanes and polyureas and are often pigmented either yellow or light. However, the embodiments are not limited by the base color of the surface. When the retroreflective beads are applied, the line is flooded with the retroreflective beads that embed into the surface of the line. The line is ready for traffic in two to ten minutes, depending on the specific line chemistry used. Alternatively, the retroreflective bead article may be mixed with small, bare retroreflective beads known in the art.

Paint is commonly a liquid with a solvent a polymer, vehicle or binder and common additives.

Vehicle

The vehicle is composed of the binder; or, if it is necessary to thin the binder with a diluent like solvent or water, it is the combination of binder and diluent. In this case, once the paint has dried or cured very nearly all the diluent has evaporated and only the binder is left on the coated surface. Thus, an important quantity in coatings formulation is the "vehicle solids", sometimes called the "resin solids" of the formula. This is the proportion of the wet coating weight that is binder, i.e. the polymer backbone of the film that will remain after drying or curing is complete.

Binder or Film Former

The binder is the film-forming component of paint. It is the only component that is always present among all the various types of formulations. Many binders are too thick to be applied and must be thinned. The type of thinner, if present, varies with the binder. The binder imparts properties such as gloss, durability, flexibility, and toughness. Binders include synthetic or natural resins such as alkyds, acrylics, vinyl-acrylics, vinyl acetate/ethylene (VAE), polyurethanes, polyesters, melamine resins, epoxy, silanes or siloxanes or oils.

Polymer Binders

The following polymer materials can find use in combination with the retroreflective objects. The polymer can be used as a component of disclosed paints films and tapes.

In paints the major polymer used in aqueous based paints are acrylic materials. In organic solvent-based alkyd paints, there are two types of alkyd resins, drying (including semi drying) and nondrying. Both types are typically produced from dicarboxylic acids or anhydrides, such as phthalic anhydride or maleic anhydride, and polyols, such as trimethylolpropane, glycerin, or pentaerythritol. Alkyds are also used in items such as resins and paints.

In tapes or films, the most common polymers are acrylics, polyolefins, Polyvinyl chloride (PVC). The following thermoplastics can have uses in the disclosed products.

Acrylic, a polymer called poly(methyl methacrylate) (PMMA), is also known by trade names such as Lucite, Perspex and Plexiglas. It serves as a sturdy substitute for glass for items such as aquariums, motorcycle helmet visors, aircraft windows, viewing ports of submersibles, and lenses of exterior lights of automobiles. It is extensively used to make signs, including lettering and logos. In medicine, it is used in bone cement and to replace eye lenses. Acrylic paint consists of PMMA particles suspended in water. Acrylonitrile butadiene styrene (ABS) is a terpolymer synthesized from styrene and acrylonitrile in the presence of polybutadiene. ABS is a light-weight material that exhibits high impact resistance and mechanical toughness. It poses few risks to human health under normal handling. It is used in many consumer products, such as toys, appliances, and telephones.

Nylon belongs to a class of polymers called polyamides. It has served as a substitute mainly for hemp, cotton and silk, in products such as parachutes, cords, sails, flak vests and clothing. Nylon fibers are useful in making fabrics, rope, carpets and musical strings, whereas in bulk form, nylon is used for mechanical parts including machine screws, gears and power tool casings. In addition, it is used in the manufacture of heat-resistant composite materials.

Polycarbonate (PC) thermoplastics are known under trademarks such as Lexan, Makrolon, Makroclear, and arcoPlus. They are easily worked, molded, and thermoformed for many applications, such as electronic components, construction materials, data storage devices, automotive and aircraft parts, check sockets in prosthetics, and security glazing. Polycarbonates do not have a unique resin identification code. Items made from polycarbonate can contain the precursor monomer bisphenol A (BPA).

Polyethylene (polyethene, polythene, PE) is a family of similar materials categorized according to their density and molecular structure. It is also known as poly and is obtained by the addition polymerization of ethylene. embodiments may be of low density or high density depending upon the process used in its manufacturing. It is resistant to moisture and most of the chemicals. It is flexible at room temperature (and low temperature) and can be heat sealed. Since it is an inexpensive plastic it is made in large amounts to cater demand. For example:

Ultra-high-molecular-weight polyethylene (UHMWPE) is tough and resistant to chemicals. It is used to manufacture moving machine parts, bearings, gears, artificial joints and some bulletproof vests. High-density polyethylene (HDPE), recyclable plastic no. 2, is commonly used as milk jugs, liquid laundry detergent bottles, outdoor furniture, margarine tubs, portable gasoline cans, drinking water distribution systems, water drainage pipes, and grocery bags. Medium-density polyethylene (MDPE) is used for packaging film, sacks and gas pipes and fittings. Low-density polyethylene (LDPE) is flexible and is used in the manufacture of squeeze bottles, milk jug caps, retail store bags and linear low-density polyethylene (LLDPE) as stretch wrap in transporting and handling boxes of durable goods, and as the common household food covering.

Polypropylene (PP) is useful for such diverse products as reusable plastic food containers, microwave- and dishwasher-safe plastic containers, diaper lining, sanitary pad lining and casing, ropes, carpets, plastic moldings, piping systems, car batteries, insulation for electrical cables and filters for gases and liquids. In medicine, it is used in hernia treatment and to make heat-resistant medical equipment. Polypropylene sheets are used for stationery folders and packaging and clear storage bins. Polypropylene is defined by the recyclable plastic number 5. Although relatively inert, it is vulnerable to ultraviolet radiation and can degrade considerably in direct sunlight. Polypropylene is not as impact resistant as the polyethylene (HDPE, LDPE). It is also somewhat permeable to highly volatile gases and liquids.

Polystyrene is manufactured in various forms that have different applications. Extruded polystyrene (PS) is used in the manufacture of disposable cutlery, CD and DVD cases, plastic models of cars and boats, and smoke detector housings. Expanded polystyrene foam (EPS) is used in making insulation and packaging materials, such as the "peanuts" and molded foam used to cushion fragile products. Polystyrene copolymers are used in the manufacture of toys and product casings.

Polyvinyl chloride (PVC) is a tough, lightweight material that is durable, rigid and versatile, and is resistant to acids and bases. Much of it is used by the construction industry, such as for vinyl siding, drainpipes, gutters and roofing sheets. It is also converted to flexible forms with the addition of plasticizers, thereby making it useful for items such as hoses, tubing, electrical insulation, coats, jackets and upholstery. Flexible PVC is also used in inflatable products, such as water beds and pool toys. As PVC bends easily and tends to be bent during transit, a method to mitigate this deformation is to heat the plastic until it becomes mobile, then reform the material into the desired shape.

PVC is produced in many specific modifications to affect its chemical and physical properties. In plasticized polyvinyl chloride (pPVC), plasticizers are added to the raw material before molding to make it more flexible or pliable. Early on, the health and environmental aspects of this were poorly understood and replacements and product bans resulted after studies. The original form is often referred to as unplasticized polyvinyl chloride (uPVC), which is the more commonly used type for installations such as water, waste, and sewer conveyance plumbing.

Chemical modification often produces more drastic changes in properties. Chlorinated polyvinyl chloride (CPVC) is produced through exposing PVC to the continued free-radical chlorination reaction that originally formulates the PVC polymer. The chlorination reaction continues to add chlorine atoms to the polymer hydrocarbon backbone until most commercial applications reach a percent range between 56 to 74% total chlorine. This increase in elemental chlorine content contributes to CPVC's increased expression of chlorine-based characteristics, such as chemical durability, resistance to acids, bases, and salts; susceptibility to ammonia-based compounds, aromatics, esters, ketones; chemical stability; heat energy transfer resistance. CPVC is commonly used in water, chemical, hot and cold, delivery systems for residential, commercial, and industrial applications.

Polyvinylidene fluoride, PVDF, belongs to the fluoropolymer class of thermoplastics and is known for its high chemical inertness and resistance. PVDF is obtained through the polymerization of the vinylidene fluoride monomer. PVDF thermoplastic is fabricated into sheets and pipes for engineering uses as well as powders and coatings that can be dissolved in solvents and applied across a product surface. PVDF is widely used in the chemical industry as piping for aggressive chemicals and high purity liquids. The PVDF material is used in construction, transportation, chemical processes, electricity, batteries, wastewater and treatment.

Binders can be categorized according to the mechanisms for film formation. Thermoplastic mechanisms include drying and coalescence. Drying refers to simple evaporation of the solvent or thinner to leave a coherent film behind. Coalescence refers to a mechanism that involves drying followed by actual interpenetration and fusion of formerly discrete particles. Thermoplastic film-forming mechanisms are sometimes described as "thermoplastic cure" but that is a misnomer because no chemical curing reactions are required to knit the film. Thermosetting mechanisms, on the other hand, are true curing mechanism that involve chemical reaction(s) among the polymers that make up the binder. Thermoplastic mechanisms: Some films are formed by simple cooling of the binder. For example, encaustic or wax paints are liquid when warm, and harden upon cooling. In many cases, they soften or liquefy if reheated.

Paints that dry by solvent evaporation and contain the solid binder dissolved in a solvent are known as lacquers. A solid film forms when the solvent evaporates. Because no chemical crosslinking is involved, the film can re-dissolve in solvent; as such, lacquers are unsuitable for applications where chemical resistance is important. Classic nitrocellulose lacquers fall into this category, as do non-grain raising stains composed of dyes dissolved in solvent. Performance varies by formulation, but lacquers generally tend to have better UV resistance and lower corrosion resistance than comparable systems that cure by polymerization or coalescence.

The paint type known as Emulsion in the UK and Latex in the United States is a water-borne dispersion of sub-micrometer polymer particles. These terms in their respective countries cover all paints that use synthetic polymers such as acrylic, vinyl acrylic (PVA), styrene acrylic, etc. as binders. The term "latex" in the context of paint in the United States simply means an aqueous dispersion; latex rubber from the rubber tree is not an ingredient. These dispersions are prepared by emulsion polymerization. Such paints cure by a process called coalescence where first the water, and then the trace, or coalescing, solvent, evaporate and draw together and soften the binder particles and fuse them together into irreversibly bound networked structures, so that the paint cannot dissolve in the solvent/water that originally carried it. The residual surfactants in paint, as well as hydrolytic effects with some polymers cause the paint to remain susceptible to softening and, over time, degradation by water. The general term of latex paint is usually used in the United States, while the term emulsion paint is used for the same products in the UK and the term latex paint is not used at all.

Thermosetting mechanisms: Paints that cure by polymerization are generally one- or two-package coatings that polymerize by way of a chemical reaction, and cure into a crosslinked film. Depending on composition they may need to dry first, by evaporation of solvent. Classic two-package epoxies or polyurethanes would fall into this category.

The "drying oils", counter-intuitively, cure by a crosslinking reaction even if they are not put through an oven cycle and seem to simply dry in air. The film formation mechanism of the simplest examples involves first evaporation of solvents followed by reaction with oxygen from the environment over a period of days, weeks and even months to create a crosslinked network. Classic alkyd enamels would fall into this category. Oxidative cure coatings are catalyzed by metal complex driers such as cobalt naphthenate.

Recent environmental requirements restrict the use of volatile organic compounds (VOCs), and alternative means of curing have been developed, generally for industrial purposes. UV curing paints, for example, enable formulation with very low amounts of solvent, or even none. This can be achieved because of the monomers and oligomers used in the coating have relatively very low molecular weight and are therefore low enough in viscosity to enable good fluid flow without the need for additional thinner. If solvent is present in significant amounts, generally it is mostly evaporated first and then crosslinking is initiated by ultraviolet light. Similarly, powder coatings contain little or no solvent. Flow and cure are produced by heating of the substrate after electrostatic application of the dry powder.

Combination mechanisms: So-called "catalyzed" lacquers" or "crosslinking latex" coatings are designed to form films by a combination of methods: classic drying plus a curing reaction that benefits from the catalyst. There are paints called plastisol/organosols compositions, which are made by blending PVC granules with a plasticizer. These are stored and the mix coalesces.

Diluent or Solvent or Thinner

The main purposes of the diluent are to dissolve the polymer and adjust the viscosity of the paint. It is volatile and does not become part of the paint film. It also controls flow and application properties, and in some cases can affect the stability of the paint while in liquid state. Its main function is as the carrier for the nonvolatile components. To spread heavier oils (for example, linseed) as in oil-based interior house paint, a thinner oil is required. These volatile substances impart their properties temporarily—once the solvent has evaporated, the remaining paint is fixed to the surface. This component is optional: some paints have no diluent.

Water is the main diluent for water-borne paints, even the co-solvent types.

Solvent-borne, also called oil-based, paints can have various combinations of organic solvents as the diluent, including aliphatic, aromatic, alcohol, ketone and white spirit liquids. Specific examples are organic solvents such as petroleum distillate, esters, glycol ethers, and the like. Sometimes volatile low-molecular weight synthetic resins also serve as diluents.

Pigment and Filler

Pigments are granular solids incorporated in the paint to contribute color. Fillers are granular solids incorporated to impart toughness, texture, give the paint special properties, or to reduce the cost of the paint. Alternatively, some paints contain dyes instead of or in combination with pigments.

Pigments can be classified as either natural or synthetic. Natural pigments include various clays, calcium carbonate, mica, silica, and talc. Synthetics would include engineered molecules, calcined clays, blanc fixe, precipitated calcium carbonate, and synthetic pyrogenic silicas.

Hiding pigments, in making paint opaque, also protect the substrate from the harmful effects of ultraviolet light. Hiding pigments include titanium dioxide, phthalo blue, red iron oxide, and many others.

Fillers are a special type of pigment that serve to thicken the film, support its structure and increase the volume of the paint. Fillers are usually cheap and inert materials, such as diatomaceous earth, talc, lime, barytes, clay, etc. Floor paints that must resist abrasion may contain fine quartz sand as a filler. Not all paints include fillers. On the other hand, some paints contain large proportions of pigment/filler and binder.

Some pigments are toxic, such as the lead pigments that are used in lead paint. Paint manufacturers began replacing white lead pigments with titanium white (titanium dioxide), before lead was banned in paint for residential use in 1978 by the US Consumer Product Safety Commission. The titanium dioxide used in most paints today is often coated with silica/alumina/zirconium for various reasons, such as better exterior durability, or better hiding performance (opacity) promoted by more optimal spacing within the paint film.

Micaceous iron oxide (MIO) is another alternative to lead for protection of steel, giving more protection against water and light damage than most paints. When MIO pigments are ground into fine particles, most cleave into shiny layers, which reflect light, thus minimizing UV degradation and protecting the resin binder. Most pigments used in paint tend to be spherical, but lamellar pigments, such as glass flake and MIO have overlapping plates, which impede the path of water molecules. For optimum performance MIO should have a high content of thin flake-like particles resembling mica. ISO 10601 sets two levels of MIO content. MIO is often derived from a form of hematite.

Additives

Besides the three main categories of ingredients, paint can have a wide variety of miscellaneous additives, which are usually added in small amounts, yet provide a significant effect on the product. Some examples include additives to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (de-glossing agents), biocides to fight bacterial growth, as well as formerly mercury and the like.

Additives normally do not significantly alter the percentages of individual components in a formulation.

Film and Tape

Films and tapes are typically made from thermoplastic polymers and are formed into related structures. Both films and tapes are sheet like materials with a minimum width. Tapes generally have a width substantially greater than its thickness but are commonly produced with lengths that are arbitrary or indeterminate in length. In use many tapes are formed and then wound onto storage spools or bobbins for application and use. Often tapes are coated with adhesive materials which are often, in turn, covered with a release liner to protect the character of the adhesive materials. These sheets can have virtually any shape including square, rectangle, circular, oval or amorphous shape outlines. Alternatively, these sheets can also be made in continuous lengths of indeterminate or arbitrary lengths and can be placed onto rolls for ultimate end use. While this is not always the case, sheet like materials are typically wider than tapes but often have common thicknesses.

Films and tapes are typically manufactured using thermoplastic extrusion techniques. In such techniques, pellet thermoplastic materials are introduced into an extrusion machine onto which the pellets undergo conditions of temperature and pressure resulting in a manageable viscosity melt which can then be pushed through a die having desired dimensions for the product. Both films and tapes can be manufactured using a variety of dies, pigments, additives, or other materials that can be added to the extruder during manufacture to improve the manufacture of the product or its ultimate end appearance. Both films and tapes can be further processed to incorporate pictures, logos, or to have specific shapes embossed into the film or tape including pleats, bubbles, apertures, et cetera.

Test and Measurement Procedures

In the manufacture of the materials, the viscosity of the preparation of the paint, tape or film when the paint is mixed, or the film or tape are extruded can be measured. The minimum viscosity material with respect to the interfacial modifier would be the appropriate test of determining optimal interfacial modifier. With respect to the product using the interfacially modified retroreflective article, the quality of the product can be inspected. The paint, film or tapes having the maximum retroreflective character, and product uniformity can be used as a tool to determine the optimum interfacial modifier.

The retroreflective glass bead object fabricated will be tested and measured for their retroreflectivity characteristics, for their compliance with applicable color specifications, for their pavement coverage characteristics, for resistance to abrasion, and for resistance to wear. The retroreflective glass bead article will be measured in characteristics and values, relative to these parameters, and compared to known commercially available reflective glass highway marking materials.

Retroreflectivity of the retroreflective glass bead object will be measured using the method set forth in ASTM Specification E1710 entitled "Test Method for Measurement of Retroreflective Pavement Marking Materials with CEN Prescribed Geometry Using Portable Reflectometer." In measuring retroreflectivity, the retroreflective glass bead object will be tested (i) alone within a line along a tape without any background paint, (ii) positioned alone on a tape after handling and packaging subsequent to manufacturing, (iii) with the retroreflective glass bead object alone on tape after a shake test (described below) of the retroreflective glass bead object, (iv) with the retroreflective glass bead object placed alone on a painted line, and (v) with the retroreflective glass bead object positioned together with standard glass beads used for highway marking on a painted line in a laboratory after the media and beads had been tested for wear according to the wear test described below.

Results from measuring retroreflectivity will be given for the examples and field trials below where retroreflectivity is expressed in millicandelas per square meter per lux, which is the unit of retroreflectivity as specified in ASTM E1710. All measurements of retroreflectivity will be made using a commercially available Mirolux 30 retroreflectometer following the procedure set forth in ASTM E1710.

Color of the retroreflective glass bead object will be measured following the procedure set forth in ASTM E1349 entitled "Test Method for Reflectance Factor and Color by Spectrophotometer Using Bi-Directional Geometry" to determine compliance with ASTM D6628, entitled "Standard Specification for Color of Pavement Marking Materials," which is the applicable standard. One measurement of the color of the retroreflective glass bead object will be made with the object freely standing, being stacked one on another on a base. A second measurement of the color of the retroreflective glass bead object will be made with the object interspersed with standard highway marking glass beads on a painted line. A third measurement of the color of the retroreflective glass bead object will be made after retroreflective glass bead object were interspersed with standard glass highway marking beads on a painted line after wear testing pursuant to the wear test procedure described below.

For all the retroreflective glass bead object, fabricated according to the examples herein that will be set forth below, the color always fell within the ASTM D6628 color box, and also within the more stringent State of Virginia color box for retroreflective glass bead object.

Evaluation of the coverage of the retroreflective glass bead object will be based on viewing retroreflective glass bead object under a microscope using from twenty to forty times magnification. The coverage afforded by the retroreflective glass bead object will be observed and empirical data recorded as retroreflectivity will be measured. This will be done (i) viewing the retroreflective glass bead media alone, immediately after manufacture, (ii) viewing retroreflective glass bead media alone after being handled and packaged in the manufacturing facility, and (iii) viewing the retroreflective glass bead media alone after having undergone the shake test described below.

Retroreflective glass bead object will be further evaluated using a "shake test" designed to compare batches of retroreflective glass bead object one to another and to simulate severe abrasion of retroreflective glass bead object. In the shake test, fifty (50) grams of retroreflective glass bead object will be combined in a steel one pint can with one hundred (100) grams of grinding media, namely one-half inch by one-half inch Burundum ceramic media available from Fisher Scientific. The can will be then shaken vigorously for 60 seconds. After shaking, a 20-mesh screen is used to sieve out any loose, very fine generally spherical glass members. Material that passes through the 20-mesh screen, and hence is smaller than 20 mesh, will be then weighed and recorded as a percentage of the retroreflective glass bead media.

A wear test to expose a finished stripe, consisting of paint having retroreflective glass bead object and standard highway marking glass beads also applied thereto, is used to simulate exposure to severe continuous high-speed rubber wheel traffic. A sample stripe is be prepared on concrete with epoxy paint. Retroreflective glass bead object and standard highway marking beads will be applied to the epoxy paint stripe. Retroreflectivity is measured, and color determined for the stripe, using the ASTM procedures and equipment described above, both before and after the test. For the test, four-inch diameter rubber wheels, each weighted down with twenty pound weights and spinning at a speed of 176 revolutions per minute, is run on a ten-inch diameter track to which the epoxy paint stripe, the retroreflective glass bead object, and standard highway marking beads have been applied, for sixty (60) minutes, with a short interruption after each ten minute segment so that temperature does not rise too high due to friction.

Example 1

Into a one-liter container was placed 500 grams of the large-core bead component. A portion of the large-bead component was placed into a heated reaction vessel at room temperature. Into the container was added 2.5 grams of an interfacial modifier to the large-bead component in the container at a rate of about 0.5 parts of interfacial modifier per hundred parts of the large-bead component. The contents of the container were agitated until uniform and then placed into the room temperature reaction vessel and heated. The contents of the heated reaction vessel were agitated until uniform. The reaction vessel was then heated to 95 degrees Centigrade and maintained at that temperature for a short period.

Into 11 Coors ceramic crucibles were placed 35 grams of the interfacially-modified large-bead components. While the crucibles were not heated, the temperature of the interfacially-modified large-bead components was estimated to be between 80 and 90 degrees Centigrade. Into each of the crucibles containing the modified large-bead components was placed 0.820 grams of a 3M iM16K hollow glass microsphere. Once the microspheres were added to each crucible, then the contents of each crucible were agitated until uniform, serially. The appearance of the beads changed markedly. Initially, the beads appeared to be relatively transparent glass beads. However, after adding the microspheres, the beads became uniformly covered and looked as though they had a coating of a "powdered" surface comprising a uniform distribution of the hollow microspheres.

After agitation, the contents of the crucibles appeared to be simply a distribution of microspheres coated large-bead components with no uncoated large-bead components and minimal microspheres. The uniform crucible contents now at approximately ambient temperature were placed onto a heat-stable support plate and then placed into a sintering oven. The crucibles and their contents were sintered under the conditions of temperature and time in FIG. 5. The atmosphere in the oven was ambient atmosphere. The contents of the crucibles were removed and appeared to be a frangible, easily fractured, sintered mass. Each mass was compressed, and each sample fractured into a distribution of the microsphere-coated large-bead components. The material thus produced was then agitated for the purpose of removing excess microspheres, which were released into the atmosphere during break-up and agitation. The resulting coated spheres were rinsed with service water until the rinse water ran clear.

Into the container of the coated large beads was placed approximately 700 millimeters of service water, which was then agitated for five minutes for the purpose of ensuring that all unbonded microspheres and unsintered microspheres were removed from the coated materials. The damp beads were then dried with a heat gun until fully dried of rinse water. Once dried, the beads acted as a free-flowing powder without agglomeration or adherence to containers or appliances. The resulting dry powder was then sieved to remove small particles (less than 850μ (20 mesh)) and large particles (greater than 2000μ (10 mesh)). The overall yield of coated particles was about 381 grams (96.9% yield), having a specific gravity of 2.6062 grams per cubic millimeter.

Visual inspection of the coated material showed that each large-bead component was substantially coated (greater than 95% surface area) of a single layer of microspheres. The microspheres appeared to be uniform in spacing. In dealing with the coated material and handling the material, once washed and sieved and dried, the microspheres appeared to be fully sintered to the underlying large beads with a fused centered attachment. The beads and the microspheres did not appear to be changed physically by the process. There is no adhesive used during the construction of the small beads sintered to the large beads. Thus the underlying optical properties of the both beads are maintained as well as having increased durability properties for the bead construction. The large beads appeared to maintain the initial diameter and composition, whereas the microspheres appeared to be the same as the starting raw material. Visual inspection of the coated microspheres showed the center halo of the beads, indicating that the microspheres maintained spherical character throughout the method of preparation.

Example 2—Retroreflective Lacquer

A retroreflective lacquer is made, that is clear except for the retro-reflective beads. The lacquer is made from the following table of ingredients including a solid phase component and a vehicle phase component. The vehicle phase component is made by blending the components in water in order starting with the solvent followed by the plasticizer, vehicle, polymer and flame retardant. The substantially liquid mixture is agitated until uniform and into the mixture is added in order the sintered particle of Ex. 1 followed by the pH adjuster aqueous base material. The lacquer contains 60 vol. % of the retroreflective beads when fully formulated. About 40 grams of the lacquer is layered onto a red pigmented polystyrene sheet that is about 30 by 30 cm having a thickness of 0.5 millimeters. The lacquer forms a uniform layer. The volatile solvent and water components evaporate leaving a lacquer film with an ordered layer of beads bloomed to the surface.

|  | GRAMS |
|---|---|
| Solids phase components |  |
| Sintered Particle of claim 1 | 160 |
| Ethylene glycol | 3.0 |
| Block polymer dispersant | 6.0 |
| Nonyl Phenol ethoxylate surfactant | 2.0 |
| Anti-foam | 0.3 |
| Base (pH adjuster) | About 0.5 as needed for pH |
| Vehicle phase components |  |
| Vehicle polymer | 550 |
| Flame retardant | 7.0 |
| Plasticizer | 12.0 |
| Solvent—diethylene glycol butyl ether | 12.0 |
| Water | 200 |

Example 3—Retroreflective Film

To produce 600-1000μ thickness, clear, PVC sheet with a retroreflective composite particle, following particulate ingredients, 100 g of PVC pellet, 138 g retroreflective bead of example 1, 2 g dioctyl phthalate, and 2 g of heat stabilizer are combined and stirred in a high-speed mixer for 5 minutes. The resultant mixture is melted to a temperature ranging from 160° to 180° C. and sent onto a chilled calendaring roll to form a plastic film (sheet) with thickness of less than 0.4 mm. The roll chills and sets the melting plastic film (sheet). The water is removed from the cooled plastic film by heating the plastic film to remove residual water. The plastic film, at a temperature from 30° C. to 85° C., is compressed at a pressure of about 4 kg/cm$^2$ on the plastic film (sheet) reducing the film thickness to 0.2 mm leaving a single layer ordered array of retroreflective beads.

Example 4

Onto a clear polystyrene sheet of 3 cm square having a thickness of about 1 mm is placed about 1 gram of an aqueous acrylic adhesive material. The volatile component of the adhesive is removed leaving a tacky film surface. Onto the tacky film service is placed an excess about of retro-reflective bead of Ex. 1 to flood the surface. This amount of bead is contacted with the adhesive in order to ensure that the adhesive layer formed on the sheet is fully adhered to a complete layer of polystyrene beads and excess bead is discarded. The polystyrene bead layer is then compressed at a pressure of about 1 g-m$^2$ for 60 seconds leaving a single layer ordered array of retro-reflective beads.

Samples of each of examples one, two and three, when viewed under conditions of minimal lighting showed substantial retroreflective character.

The following table demonstrates the formulation prepared in these examples. The bead formulation details are as follows:

| Mesh | um | mass on | wt. % |
|---|---|---|---|
| Larger Core bead | | | |
| 10 | 2000 | 0.00 | 0.00% |
| 16 | 1180 | 250.10 | 84.21% |
| 20 | 850 | 46.80 | 15.76% |
| 30 | 600 | 0.10 | 0.03% |
| Pan | 0 | 0.00 | 0.00% |
| | | 297.00 | 100.00% |
| Smaller peripheral bead | | | |
| 200 | 75 | 0.8 | 0.27% |
| 230 | 63 | 1.3 | 0.44% |
| 270 | 53 | 47.3 | 15.87% |
| 325 | 45 | 139.7 | 46.86% |
| 450 | 32 | 71 | 23.82% |
| 500 | 25 | 22.5 | 7.55% |
| 632 | 20 | 10.6 | 3.56% |
| pan | 0 | 4.9 | 1.64% |
| | | 298.1 | 100.00% |

Started sintering program: setpoints were as follows (under atmospheric gas conditions):

| | ° C. | T (Min) |
|---|---|---|
| 1 | 22 | 120 |
| 2 | 685 | 42 |
| 3 | 685 | 240 |
| 4 | 50 | −121 (end) |

DETAILED DESCRIPTION OF THE DRAWINGS

Referring to FIGS. 1, 2, 3 and 6, in FIG. 1 an image showing the retroreflective glass bead (10) in accordance with the embodiment with the exterior of the central retroreflective large glass central component (12) being essentially completely covered and exclusively defined by smaller generally spherical glass microsphere components, individual ones of which have been designated (14) in FIG. 1. Two complete retroreflective glass beads are labelled A and B. In FIG. 1, in fabricating retroreflective glass object where the glass bead object (10) consists of larger central microsphere glass components, the central bead or component (12), each having a plurality of smaller microsphere peripheral glass beads, spheres, or component are labelled the peripheral bead component (14). The peripheral bead components (14) are connected to the central components 12. The retroreflective bead objects are useful for highway marking or other applications, such as safety and signage, jackets, clothing, bicycles, or countertops, where retroreflectivity is useful.

Figure 2:
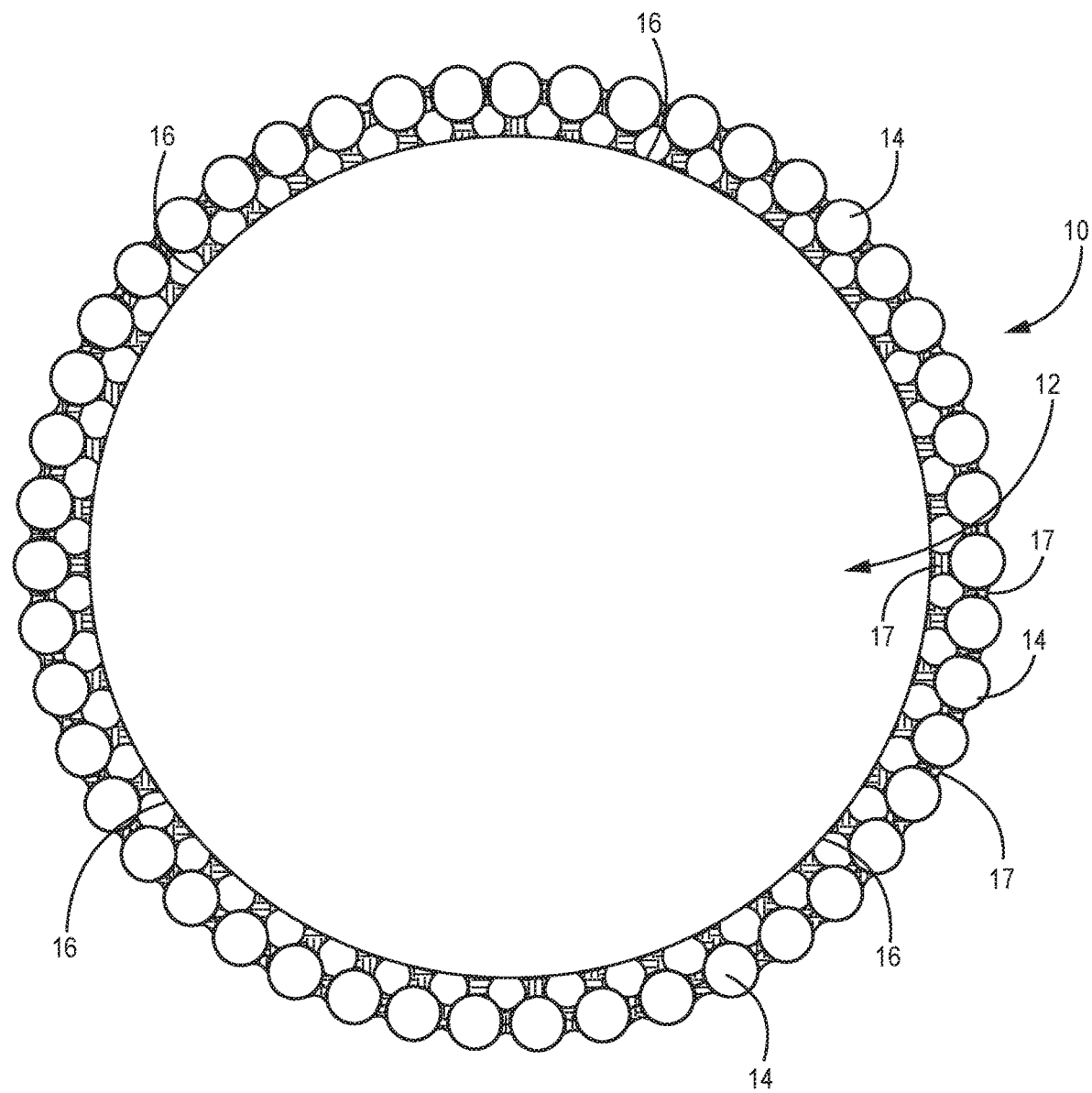
FIG. 2 is an artist's conception of a cross-sectional view the generally spherical glass beads shown in FIG. 1.

Referring to FIG. 2, an artist's schematic, the interior of retroreflective glass bead (10) is defined by a relatively larger generally spherical central glass component (12). The smaller generally spherical glass microspheres components (14), defining the exterior of retroreflective glass bead (10) as shown in the photomicrograph of FIG. 1, are illustrated in FIG. 2. Attachment of the smaller generally spherical glass microspheres components (14) to relatively larger generally spherical central glass component (12) is effectuated by a heat bonded attachment (17) through the interfacial modifier coating layer (16) in FIG. 2, FIG. 3, and FIG. 4. The smaller generally spherical microsphere glass peripheral components (14) are sufficiently attached by the attachment (17) to adjacent smaller generally microspheres glass components that the smaller generally spherical microspheres glass components (14) rigidly and fixedly form part of the retroreflective glass bead (10).

Figure 3:
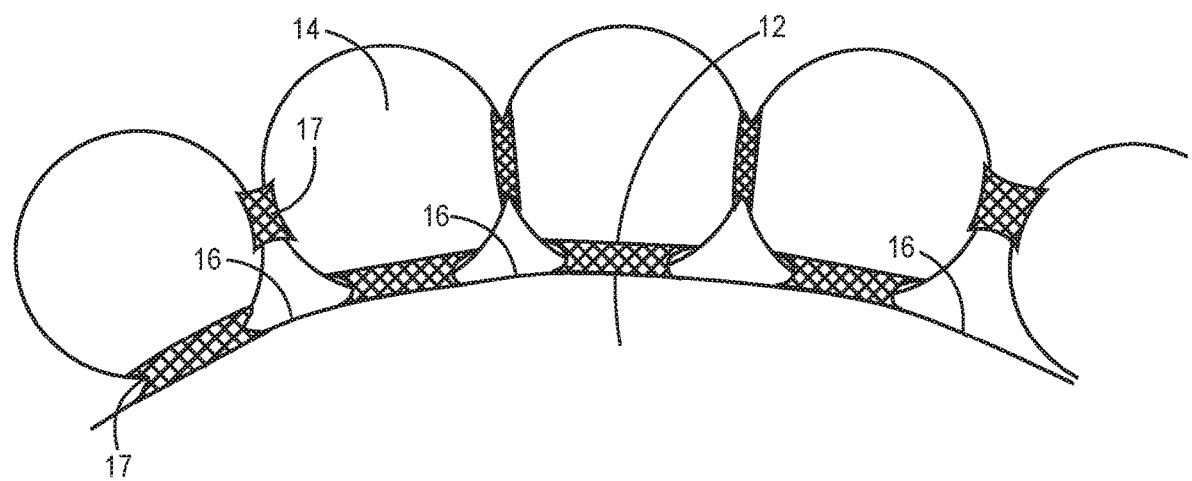
FIG. 3 is an artist's conception enlarged sectional view of a portion of the generally spherical glass beads for highway marking in accordance with embodiments of the disclosure, with the smaller exterior generally peripheral, spherical glass components.

In FIG. 3, an artist's schematic, a broken portion of the relatively larger generally spherical central glass component (12) is depicted with several of the smaller generally microspheres central glass components (14) attached through the IM coating layers (16), The "neck" (17) shows the heat-formed attachment by the IM coating on the surface of the relatively larger generally spherical central glass component (12) to the smaller generally spherical central glass components. In FIG. 3, the attachment or "neck" (17) is depicted as consisting of a direct attachment through the IM coating (16) connecting the exterior of the central larger glass component (12) to the microsphere peripheral components (14). Further the microspheres components (14) can be connected to other microspheres components (14) via said attachment. The heat bonded retroreflective bead is quite durable and stable in comparison to other glass bead constructions formed by adhesion or reactive coupling agents.

Figure 4:
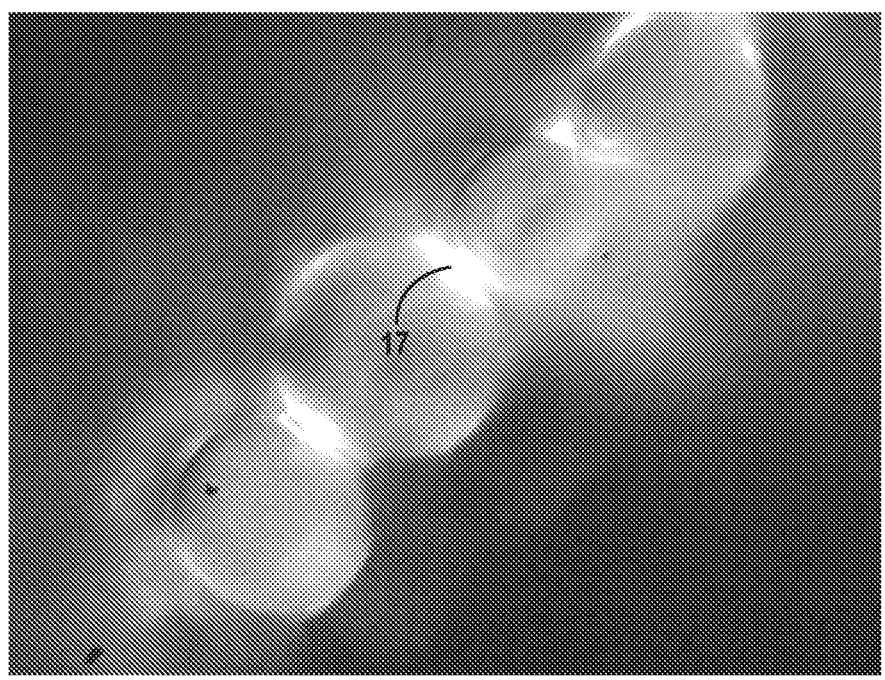
FIGS. 4 and 6 is an image showing the attachment of the generally peripheral, spherical glass components to each other.

FIG. 4 shows, upon microscopic inspection of an image, a retroreflective composite glass bead (10) with a central (12) and the smaller general spherical peripheral glass (14) components according to the embodiment. A heat bond attachment (17), the "neck" is clearly visible in the figure showing the attachment the generally spherical peripheral glass (14) components to each other. The spherical peripheral glass (14) components are attached to the surface of the central larger glass component (not shown).

Figure 5:
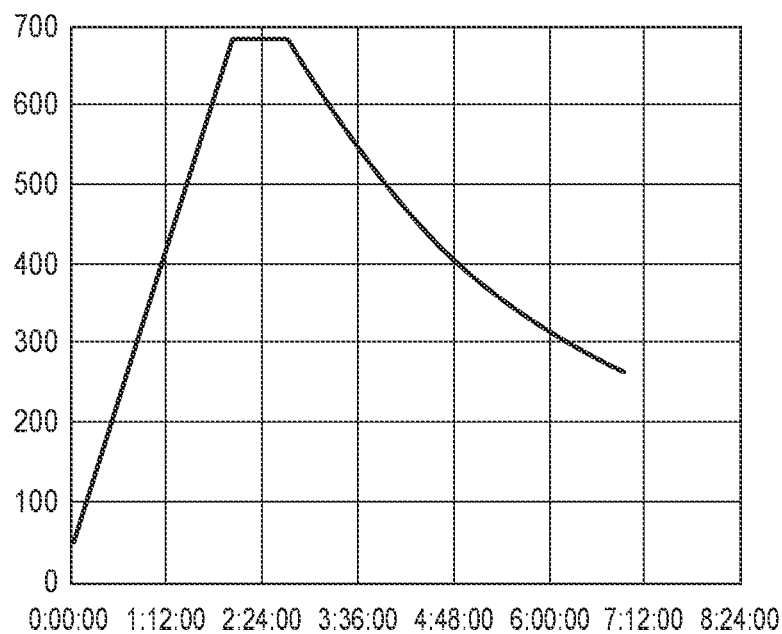
FIG. 5 is a graph of the sintering time and temperature.

FIG. 5 shows the heat profile of the sintering step leading to the fused layer of the peripheral spheres on the larger bead.

Figure 6:
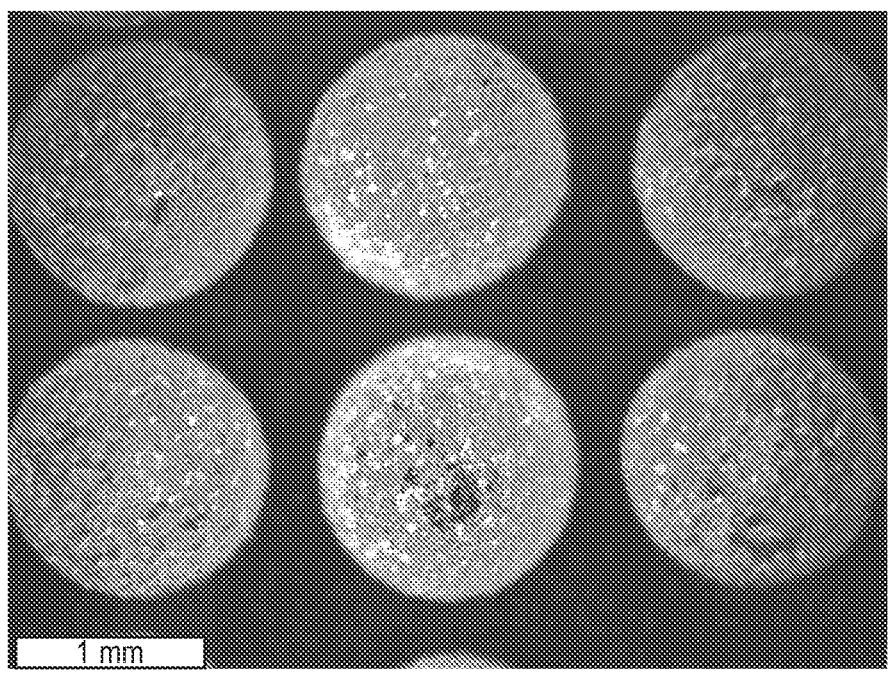

FIG. 6 shows, upon microscopic inspection of an image, a retroreflective composite glass bead (10) fully coated with a single layer of peripheral spheres on the large central bead component. The spheres are clear and not fogged or opaque to light.

Figure 7:
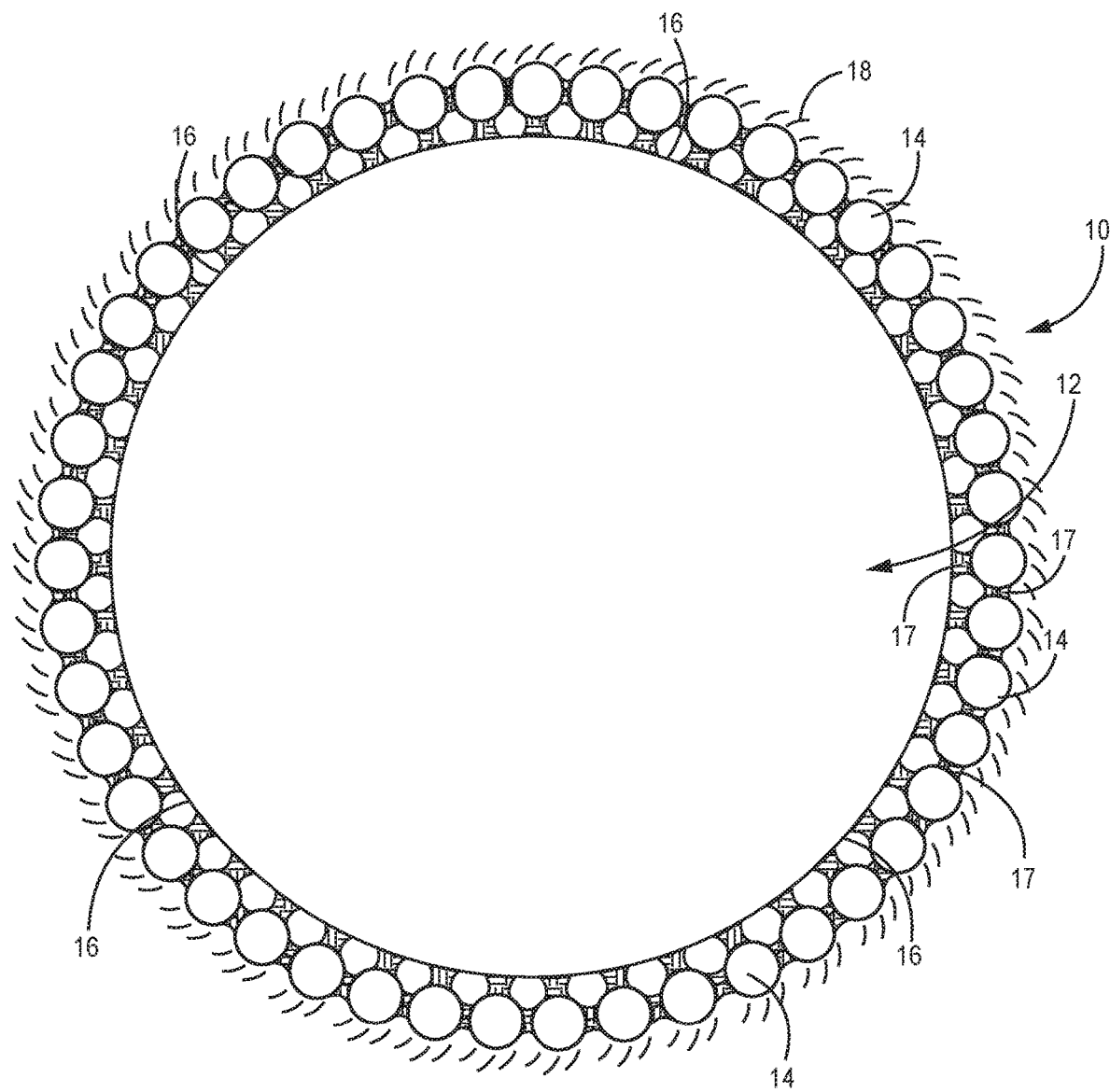
FIG. 7 is an artist's conception that shows the exterior IM coating.

FIG. 7 is an artist's schematic, the interior of a retroreflective composite glass bead (10) is defined by a relatively larger generally spherical central glass component (12). The smaller generally spherical glass components (14), defining the exterior of the retroreflective glass bead (10) as shown in FIG. 1 and illustrated in FIG. 2. Attachment of the smaller generally spherical glass components (14) to relatively larger generally spherical central glass component (12) is effectuated by a heat bonded attachment (17) through the interfacial modifier coating layer (16) in FIG. 2, FIG. 3, and FIG. 4. The smaller generally spherical glass peripheral components (14) are sufficiently attached by the attachment (17) to adjacent smaller generally spherical glass components (14) rigidly and fixedly form part of the retroreflective glass bead (10). The bead (10) is coated with a second interfacial modifier layer (18), which may be the same or different from interfacial modifier (16).

Average diameter of the relatively larger generally spherical central glass component designated (12) in the drawings is about 1.2 millimeters, or about 0.85 millimeters to 1.4 millimeters, or about 0.6 to about 2.0 millimeters.

The useful average diameter for the smaller generally spherical glass members designated (14) in the drawings is 75µ, or about 60µ to about 90µ, or about 40 to about 200µ.

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

The specification shows an enabling disclosure of the composite technology, other embodiments may be made with the claimed materials.

We claim:

1. A retroreflective bead object comprising coated and sintered central and peripheral component free of any adhesive component comprising:
   (i) a central glass bead component; and
   (ii) a plurality of peripheral glass microsphere components, wherein the plurality of the peripheral glass components forms an array on the surface of glass central component forming the retroreflective bead object;
   wherein the central and peripheral components are bonded, and volatile components are removed, leaving a substantially complete coating of a residue of an interfacial modifier.

2. The object of claim 1 in which the central component is in the range of from about 500 microns to about 2 mm and the peripheral components are in the range of from about 1µ to 300µ.

3. The object of claim 1 wherein the central component is spherical.

4. The object of claim 3 wherein the peripheral components are of a generally spherical configuration.

5. The object of claim 1 wherein a ratio of diameter of microsphere central component to the peripheral microsphere glass components is greater than 200:1.

6. The object of claim 1, wherein a ratio of diameter of microsphere central component to the peripheral microsphere glass components is greater than 100:1.

7. The object of claim 6 wherein the microsphere glass central component has an average diameter of less than about 2 mm.

8. The object of claim 6 wherein the microsphere glass central component has an average diameter of less than about 1 mm.

9. A retroreflective bead object comprising a polymer layer and the retroreflective bead object of claim 1.

10. A method of making a retroreflective bead object free of any adhesive component comprising making a bead comprising:
   a. Coating a plurality of glass bead central components with an interfacial modifier;
   b. Mixing a plurality of peripheral glass microsphere components with the interfacially modified coated central component to form an initial array of peripheral components on the larger component;
   c. Heat bonding the glass central component to the peripheral glass members to make the retroreflective object wherein the central and peripheral components are bonded, and volatile components are removed, leaving a substantially complete coating of residue of an interfacial modifier; and
   d. Combining it with a polymer.

11. A film comprising the polymer and the object of claim 1 dispersed in the polymer.

12. A liquid coating composition comprising a liquid carrier, the polymer, and the retroreflective bead of the object of claim 1.

* * * * *